United States Patent
Williams

(10) Patent No.: US 10,833,626 B2
(45) Date of Patent: Nov. 10, 2020

(54) MATRIX CONVERTER MOTOR WINDING TEMPERATURE CONTROL WITH CLOSED FEEDBACK LOOP

(71) Applicant: ITT MANUFACTURING ENTERPRISES LLC., Wilmington, DE (US)

(72) Inventor: Dean Patrick Williams, Moravia, NY (US)

(73) Assignee: ITT MANUFACTURING ENTERPRISES LLC, Wilmington, DE (US)

( * ) Notice: Subject to any disclaimer, the term of this patent is extended or adjusted under 35 U.S.C. 154(b) by 16 days.

(21) Appl. No.: 15/718,797

(22) Filed: Sep. 28, 2017

(65) Prior Publication Data

US 2019/0097568 A1    Mar. 28, 2019

(51) Int. Cl.
*H02P 29/62*    (2016.01)

(52) U.S. Cl.
CPC .......... *H02P 29/62* (2016.02); *H02P 2207/01* (2013.01)

(58) Field of Classification Search
CPC .. H02P 1/26; H02P 23/14; H02P 29/64; H02P 27/08; H02K 15/25; H02K 11/00; H02H 7/08; H02H 7/0833; H02H 6/00
See application file for complete search history.

(56) References Cited

U.S. PATENT DOCUMENTS

| | | | | | |
|---|---|---|---|---|---|
| 2,240,207 | A | * | 4/1941 | Crawford | H02K 15/125 318/558 |
| 4,195,324 | A | * | 3/1980 | Waltz | H02K 15/125 318/436 |
| 4,355,269 | A | * | 10/1982 | Burton | H02K 15/125 318/436 |

(Continued)

FOREIGN PATENT DOCUMENTS

| | | |
|---|---|---|
| DE | 102008035546 A1 | 11/2009 |
| WO | 2002089307 A1 | 11/2002 |

OTHER PUBLICATIONS

"Heaters and Trickle Voltage Heating to Combat Motor Condensation," Nidec Motor Corporation, pp. 12-14, 2016. http://www.usmotors.com/TechDocs/ProFacts/Heaters-TrickleVoltage.aspx.

(Continued)

*Primary Examiner* — Rina I Duda
(74) *Attorney, Agent, or Firm* — Hertzberg, Turk & Associates, LLC

(57) ABSTRACT

Apparatus features a matrix converter having a signal processor or processing module configured to: receive signaling containing information about a motor winding temperature sensed inside a motor when the motor is not being required to produce torque and rotation; and determine corresponding signaling containing information about a controlled direct current (DC) level for applying to at least one motor winding of the motor in order to provide a desired level of heating to the motor, based upon the signaling received. The signal (Continued)

processor or processing module provides the corresponding signaling so controlled DC signaling is sent to the at least one motor winding of the motor. The signal processor or processing module also provides the corresponding signaling so alternating controlled DC signaling is sent to all three motor windings of the motor.

16 Claims, 4 Drawing Sheets

(56) References Cited

U.S. PATENT DOCUMENTS

| | | | | |
|---|---|---|---|---|
| 5,510,687 | A * | 4/1996 | Ursworth | H02H 7/0833 318/471 |
| 5,708,336 | A * | 1/1998 | Eyerly | H02H 7/0852 318/436 |
| 6,023,136 | A * | 2/2000 | Pinewski | B60L 15/08 318/400.09 |
| 6,529,135 | B1 | 3/2003 | Bowers et al. | |
| 6,642,682 | B1 * | 11/2003 | Perkins | G05D 23/1919 318/436 |
| 8,038,412 | B2 * | 10/2011 | Durtschi | F04B 49/00 417/14 |
| 8,084,984 | B2 * | 12/2011 | Lu | H02P 29/64 318/432 |
| 8,734,125 | B2 | 5/2014 | McSweeney et al. | |
| 8,866,429 | B2 * | 10/2014 | Niizuma | H02P 27/08 318/139 |
| 2008/0067970 | A1 | 3/2008 | Qian et al. | |
| 2010/0156338 | A1 | 6/2010 | Lu et al. | |
| 2013/0027160 | A1 | 1/2013 | Morita et al. | |
| 2013/0271060 | A1 | 10/2013 | Messersmith et al. | |
| 2017/0222595 | A1 | 8/2017 | Daugherty, III | |

OTHER PUBLICATIONS

"Keeping Motor Windings Dry," Facilities Instructions, manual, Standards, and Techniques, United States Department of Interior, Bureau of Reclamation, Nov. 1991, vol. 3-4, Denver, Co. http://www.usbr.gov/power/data/fist/fist3_4/vol3-4.pdf.
Ryan, Thomas J., "Preventing Condensation in 3-Phase AC Motors," Electrical Construction and Maintenance, Nov. 1966. http://ecmweb.com/content/preventing-condensation-3-phase-ac-motors.
English language Abstract of DE102008035546A1.

* cited by examiner

FIG. 3A: Example of PID algorithmn

MATRIX CONVERTER MOTOR WINDING TEMPERATURE CONTROL WITH CLOSED FEEDBACK LOOP

BACKGROUND OF THE INVENTION

1. Field of the Invention

The present invention relates to a technique for controlling the temperature of a motor; and more particularly, the present invention relates to a method and apparatus for controlling the temperature of a motor by providing motor windings with DC power.

2. Brief Description of Related Art

A primary cause of premature motor failure is the ingress of moisture into the motor frame due to operation in wet environments. This moisture can be presented to the motor by the process itself or via external precipitation.
The moisture can enter the windings, and dramatically lower the insulation resistance to a danger zone. See http://www.usbr.gov/power/data/fist/fist3_4/vol3-4.pdf for a more detailed description. When power is applied in this condition, a catastrophic short circuit can occur. The damage from the short circuit will require the motor to be removed from service and repaired.

One other source of water in a motor is condensation that can occur as a result of repeated heating and cooling cycles. For example, when the motor is hot due to its operation, the air within the motor expands and pushes out air. Later, when the motor cools, fresh moisture laden air will be drawn into the frame as the air contracts. As this cycle repeats again and again, substantial quantities of water can accumulate. If left unchecked, it will lead to insulation failure.

Where motors run continuously, the heat generated in the motor by normal operation can keep windings dry. But when a motor is used infrequently and is subject to large swings in temperature, there are two methods which can be used to reduce the susceptibility to failure caused by accumulated moisture.

The most popular known method is the use of heaters installed within the motor frame. In this case, cartridge heaters or silicon rubber strip heaters are placed within the motor frame and are energized during the nonoperation periods. The object of this known method is to maintain the temperature inside the motor approximately five to ten degrees Celsius warmer than the surrounding air. When this is done, condensation inside the motor is prevented and the motor will stay dry. The heater method is similar to the way light bulbs are used in closets where the climate is humid to prevent mildew on clothing and leather goods.

When these internal heaters are used, they are interconnected with the motor starter to turn on when the motor is not running and turn off when the motor is running. For a more detailed description, see: http://ecmweb.com/content/preventing-condensation-3-phase-ac-motors.

Disadvantages to this technique are as follows:
The limited reliability/serviceability of the heating elements. The motor must be taken out of service and disassembled to service the heating elements.
Additional wiring must be installed to power the heaters.
Replacement motors must require heaters to be pre-installed.
The heat is localized around the heaters, therefore not all parts of the motor are evenly heated. Areas close to the heaters could be overheated, and conversely, areas farthest away from the heaters could be inadequately warmed.

The heating elements apply a fixed amount of heat regardless of ambient environment (temperature, wind, and precipitation). In cases where the ambient temperature is already warm, the additional heating could cause undue thermal stress to the windings close to the heaters, reducing the life span of the motor.

In cases where the ambient temperature is adequately warm, the heaters will consume excess energy that is not required.

Due to the localized heating in close proximity to the heaters, interior portions of the motor are not always maintained at an elevated temperature so that condensation nevertheless can form on internal motor parts.

A second known technique of accomplishing the same result is a system called "trickle heating." In this case, a source of low voltage single phase or 3 phase AC power is applied to the motor windings when the motor is at rest. This system maintains 10% to 20% of the nameplate voltage which should correspond to typical current of 25 to 35% of nameplate amps. This results in a low energy condition that produces heat in the motor windings, and indirectly the rotor, shaft and bearings of the motor. Since the applied power is low voltage, the motor should not produce enough torque to rotate with trickle voltage applied. For a more detailed explanation, see: http://www.usmotors.comTechDocs/ProFacts/Heaters-TrickleVoltage.aspx.

A number of different techniques are employed to produce the low voltage:

A single phase, dry type, two winding transformer applies a fixed low voltage to two of the three phases, via a relay or contactor, after the three phase power has been removed.

A thyristor (Silicon Controller Rectifier) electronic soft start produces a low voltage AC output for a predetermined amount of on vs. off time, e.g., as disclosed in United States Patent Publication No. US2013/0271060.

Disadvantages to this second known technique are as follows:

The power supply applies a fixed voltage regardless of ambient temperature. In cases where the ambient temperature is already warm, the additional heating could cause undue thermal stress to the windings, reducing the life span of the motor.

In cases where the ambient temperature is adequately warm, the power supply and windings will consume excess energy that is not required.

Because no form of temperature regulation is employed, the internal motor temperature is still susceptible to large swings in temperature in extreme environments, which could create large motor resistance changes due to the positive coefficient of the motor's copper windings.

Trickle heating only connects 2 of the 3 motor windings. Heating effect is uneven, and could allow spots of condensation to form in areas that are not warm enough.

The power fed to the motor is AC. AC power produces a rotating magnetic field. Even though it is reduced in magnitude, there is always the possibility of shaft movement.

Furthermore, the inventor is not aware of any generally accepted standard method to calculate a fixed amperage that will produce the desired stabilized temperature. Therefore, a variable power source is required, and a time-intensive trial-and-error process must be carried out to discover each and every motor's individually correct voltage, amperage, and resulting rise in temperature.

A third known technique is disclosed in United States Patent Publication No. US20100156338. In this known technique, a thyristor (Silicon Controlled Rectifier SCR) controlled 3 phase AC motor soft starter is designed for 3 modes of operation. Sending full power to the AC motor as a soft start, sending a low voltage DC signal to the motor and reading the current drawn to estimate the motor's windings temperature, and finally as a low voltage 3 phase AC "trickle" heater supply to provide a proportional AC voltage signal based off the estimated motor winding temperature. The motor's winding resistance is estimated based upon the positive thermal resistance characteristic of the motor's copper windings.

Although this third known technique does a better job of trying to regulate the AC "trickle" power to stabilize the temperature inside the motor, it is still does not have a dedicated motor winding temperature sensor that is monitored continuously. By taking motor winding resistance measurements only during the motor "off" time, an estimated temperature is derived. This is still considered an "open loop" technique with no actual temperature sensing feedback. In addition, every motor is designed and built with different winding techniques, and thus, no standard is developed to provide a calibrated temperature signal from motor resistance.

U.S. Pat. No. 8,734,125 discloses a fourth known technique, which uses a "conventional" variable frequency drive (VFD) with a temperature sensor to regulate power fed to the compressor's windings. In this '125 patent, power is sent to the compressor's windings discontinuously, and the heater output to the compressor is AC.

A fifth known technique is disclosed in International Publication No. WO 2002/089307 A1 in relation to well pumps with a conventional variable frequency drive, and the feedback temperature sensor is only used to trigger an over temperature and shut down the system from running. It does not regulate the temperature based off feedback from a proportional motor temperature signal. Based upon the description in the '307 publication, the temperature sensor appears more like a switch, and not a device that feeds a proportional signal to temperature.

In view of the aforementioned, there is a need in the industry for a better way to control the temperature of a motor.

SUMMARY OF THE INVENTION

In summary, the present invention provides a new and unique technique for controlling the temperature of a motor. In effect, the present invention overcomes the aforementioned problems by providing a motor winding heater configuration that eliminates the need for typical dedicated heating elements or devices used to heat motor windings. Accordingly, embodiments of the present invention may include a matrix converter system that is configured to apply a pulsating DC voltage alternating to all three of the motor windings without the use of additional dedicated motor winding heater devices. The matrix converter serves to control the operation of the motor, while the motor windings serve both as a heater at times and to produce torque and rotation at other times.

According to some embodiments of the present invention, in applications where a matrix converter is used to control the motor, the matrix converter's power structure may be used to send AC power to the windings directly allowing the motor to produce torque and rotation. When the motor is not required to produce torque and rotation, the matrix converter's power structure may be used to send pulsating DC voltage to the motor windings directly allowing a low average DC power to heat the motor windings directly. By applying a controlled DC voltage level based off a temperature feedback sensor mounted inside the motor, a desired level of heating may be controlled.

According to some embodiments of the present invention, a motor winding heater may include a motor controller configured to receive an alternating current (AC) power and transmit at least a portion of the AC power during a conduction interval of a cycle of the AC power to a motor, the motor including a motor winding. The matrix converter may include a processor configured to control operation of a motor controller in a first operation mode and a second operation mode, where the first operation mode operates to provide variable frequency and voltage of AC power to the motor windings to cause the motor to rotate. The second operation mode operates to provide the at least a portion of pulsating DC voltage to the motor windings to heat the motor without causing the motor to rotate.

According to some embodiments of the present invention, a matrix converter may include a processor configured to control operation of the matrix converter to rotate a motor. When not rotating the motor, the processor may be configured to control the operation of the matrix converter to heat the motor, e.g., to a temperature in a range of 8° C.-10° C. above the ambient temperature. when it is between 10° C.-43° C. When the ambient temperature is below, e.g. 0° C., the processor may be configured to increase the pulsating DC output to maintain a continuous winding temperature, e.g., of no less than 10° C. When the ambient temperature rises above, e.g. 43° C., the processor may be configured to shut off the DC output because no moisture build up should occur inside the motor.

According to some embodiments of the present invention, when the processor controls the operation of the matrix converter to rotate the motor, the processor may be configured to control the operation of the matrix converter to provide appropriate AC power to the motor having a magnitude sufficient to cause the motor to rotate; and when the processor controls the operation of the matrix converter to heat the motor, the processor controls the operation of the matrix converter to transmit DC power with a switching component riding on a DC waveform. The average DC power sent to the motor having a level less than the first AC power, such that the second pulsating DC power is sufficient to heat the motor but not cause rotation. The winding temperature sensor, an ambient temperature sensor and the processor may be configured to work to keep the winding temperature at a minimum temperature in a range, e.g., of 8° C.-10° C., above ambient temperature with a maximum of 43° C. and minimum of 10° C.

Advantages of the Present Invention

Advantages of the present invention include one or more of the following:

1. Maintains a motor internal temperature in a range of about 8° C.-10° C. above the ambient temperature to prevent moisture from entering the motor frame, specifically motor windings, thereby reducing the chance of a short circuit failure due to moisture conducting across normally insulated circuits.

2. Maintains a motor internal temperature in a range of about 8° C.-10° C. above the ambient temperature to minimize moisture from entering motor frame, specifically the bearings, thereby reducing water entering bearing lubricant and damaging the bearings due to contaminated lubrication.

3. Reduces the chance of failure from frozen bearing lubricant not performing its function due to solidifying from sub-freezing temperatures.

4. Maintains a motor internal temperature in a range of about 8° C.-10° C. above the ambient temperature to minimize standing moisture from condensing on the motor frame's exterior, thereby reducing corrosive effects of oxidation from electrochemical processes, galvanic corrosion, bacterial corrosion aided by moisture, etc.

5. Stabilizes motor winding resistance to no less than about 10° C. when the ambient temperature drops below 0° C., thereby providing a stable winding resistance to the variable frequency drive electronics, and reliable motor startup with repeatable motor torque regardless of extreme low ambient temperatures.

6. Reduces the frequency of failure due to extreme thermal cycling. Thermal cycling directly relates to mechanical contraction and expansion of materials. Limiting the minimum temperature that the motor is subjected to, also limits the minimum contraction (movement) and stress of materials.

7. The heat is more evenly distributed, not localized as in the case of heating elements. Heating elements rely on convection to heat the air and thus the rotor.

8. The present invention equally alternates powering (heating) between all three phases thus heating occurs equally in all windings.

9. The power sent to the motor windings is DC with a transistor switching frequency component. DC establishes a fixed magnetic field ensuring that the shaft of the motor does not rotate.

10. The capacitive coupling of the high frequency switching component riding on the DC voltage heats the rotor as well as the windings, which means that heat can travel along the shaft by means of conduction (direct contact) to warm the bearings more effectively than by convection (heat transfer by moving air) from heaters.

11. The resistance of the motor winding becomes the heating coil, which means the elimination of disassembly and re-assembly procedures to replace defective heaters.

12. It is not necessary to run additional power wiring to the motor since the power leads are used for heating.

13. Eliminates the need to provide an independent motor winding heater and thus can save operating costs and panel space for the user.

14. Replacement motors do not have to be equipped with space heaters.

15. Small motors, especially totally enclosed, have very little room available for installation of heaters.

Moreover, in contrast to the fourth technique set forth above re the aforementioned '125 patent, the present invention may be implemented using a matrix converter feeding a motor, not a compressor. The present invention is also different in that it actively regulates the temperature continuously during the "stopped motor" off time. By way of example, the present invention may be configured to regulate the motor winding temperature in a range of about 8° C.-10° C. above the ambient temperature, e.g., between ambient temperatures in a range of 0° C.-43° C. Below the ambient temperature of 0° C., the present invention may regulate the motor's winding temperature at about 10° C. Above 43° C. ambient temperature, the present invention may shut off the heating process.

Other differences between the present invention and the aforementioned '125 patent also include the following: The '125 patent merely applies to sealed compressors with the main heater function being to keep the compressor lubricant liquid in cold environments, and was not intended to prevent motor moisture out of windings of the compressor. Moreover, in the '125 patent, the temperature sensor is located in the compressor and measures lubricant temperature.

EXAMPLES OF SPECIFIC EMBODIMENTS

According to some embodiments, the present invention may include, or take the form of, a method or apparatus featuring a matrix converter having a signal processor or signal processing module, configured to:

receive signaling containing information about a motor winding temperature sensed inside a motor when the motor is not being required to produce torque and rotation; and determine corresponding signaling containing information about a controlled direct current (DC) level for applying to at least one motor winding of the motor in order to provide a desired level of heating to the motor, based upon the signaling received.

According to some embodiments, the present invention may include one or more of the following features:

The signal processor or processing module may be configured to provide the corresponding signaling so controlled DC voltage is sent to the at least one motor winding of the motor.

The signal processor or processing module may be configured to provide the corresponding signaling so alternating controlled DC voltage is sent to all three motor windings of the motor.

The signal processor or processing module may also be configured to control the operation of the motor to produce torque and rotation required, so that all three motor windings of the motor serves as both a heater at times and to produce the torque and rotation required at other times.

The matrix converter may include a power structure with the signal processor or processing module, and the power structure is configured to receive alternating current (AC) and send AC power to all three motor windings directly allowing the motor to produce torque and rotation required.

When the motor is not required to produce torque and rotation, the power structure may be configured to send pulsating DC power to all three of the motor windings directly allowing low average DC power to heat the motor windings directly.

The apparatus may include, or take the form of, a motor controller having the signal processor or processing module that is configured to control the operation of the motor controller in a first operation mode and a second operation mode, where the first operation mode operates to provide variable frequency and voltage of AC power to the motor to cause the motor to rotate, and where the second operation mode operates to provide at least a portion of pulsating DC Power to the motor to heat all three motor windings without causing the motor to rotate.

The signal processor or processing module may be configured to control operation of the matrix converter to rotate the motor. When not rotating the motor, the signal processor or processing module is configured to receive signaling containing information about an ambient temperature, and control the operation of the matrix converter to heat the motor to a predetermined temperature above the ambient temperature. By way of example, the predetermined temperature may be in a range of 8-10° C., and the ambient temperature may be between 10° C.-43° C.

According to some embodiments, when the ambient temperature is below a predetermined low ambient temperature, the signal processor or processing module may be configured to increase a DC output to maintain a continuous winding temperature of no less than a predetermined winding temperature that is higher than the predetermined low ambient temperature. By way of example, the predetermined low ambient temperature may be about 0° C., and the predetermined winding temperature may be about 10° C.

According to some embodiments, when the ambient temperature rises above a predetermined high ambient temperature, the signal processor or processing module is configured to shut off the DC output because no moisture build up should occur inside the motor. By way of example, the predetermined high ambient temperature may be about 43° C.

The signal processor or processing module may be configured to control the operation of the matrix converter to rotate the motor in order to provide appropriate AC power to the motor having a magnitude sufficient to cause the motor to rotate.

The signal processor or processing module may be configured to control the operation of the matrix converter to heat the motor in order to transmit a low average DC power with a switching component riding on a DC waveform. The low average DC power sent to the motor may be sufficient to heat the motor but not cause rotation.

The apparatus may include a motor winding temperature sensor configured to sense a motor winding temperature and provide motor winding temperature sensor signaling containing information about the motor winding temperature sensed; and an ambient temperature sensor configured to sense an ambient temperature and provide ambient temperature sensor signaling containing information about the ambient temperature sensed. By way of example, the motor winding temperature sensor, the ambient temperature sensor and the signal processor or processing module may be configured to work together to keep the winding temperature at a minimum predetermined temperature above a predetermined ambient temperature. The minimum predetermined temperature may be in a ranged of 8-10° C. and the predetermined ambient temperature may have a maximum of about 43° C. and a minimum of about 10° C.

By way of example, the signal processor or processing module may include, or take the form of, at least one signal processor and at least one memory including computer program code, and the at least one memory and computer program code are configured to, with at least one signal processor, to cause the signal processor at least to receive the signaling (or, for example, the associated signaling) and determine the corresponding signaling, based upon the signaling received. The signal processor or processing module may be configured with suitable computer program code in order to implement suitable signal processing algorithms and/or functionality, consistent with that set forth herein.

According to some embodiments, the present invention may also take the form of a method including steps for:

receiving with a signal processor or processing module signaling of a matrix converter containing information about a motor winding temperature sensed inside a motor when the motor is not being required to produce torque and rotation; and determining with the signal processor or processing module corresponding signaling containing information about a controlled direct current (DC) level for applying to at least one motor winding of the motor in order to provide a desired level of heating to the motor, based upon the signaling received.

The method may also include one or more of the features set forth herein, including providing from the signal processor or processing module corresponding signaling containing information about the controlled direct current (DC) level, e.g., which may be used to control the temperature of the motor.

The present invention may also, e. g., take the form of a computer program product having a computer readable medium with a computer executable code embedded therein for implementing the method, e.g., when run on a signal processing device that forms part of such a motor control or a matrix converter. By way of example, the computer program product may, e. g., take the form of a CD, a floppy disk, a memory stick, a memory card, as well as other types or kind of memory devices that may store such a computer executable code on such a computer readable medium either now known or later developed in the future.

BRIEF DESCRIPTION OF THE DRAWING

The drawing includes the following Figures, which are not necessarily drawn to scale:

FIG. 3A is a diagram of an example of signal processing functionality for a PID algorithm that may be used to implement step 56k of the flowchart shown in FIG. 3, according to some embodiments of the present invention.

DETAILED DESCRIPTION OF THE INVENTION

Figure 1:
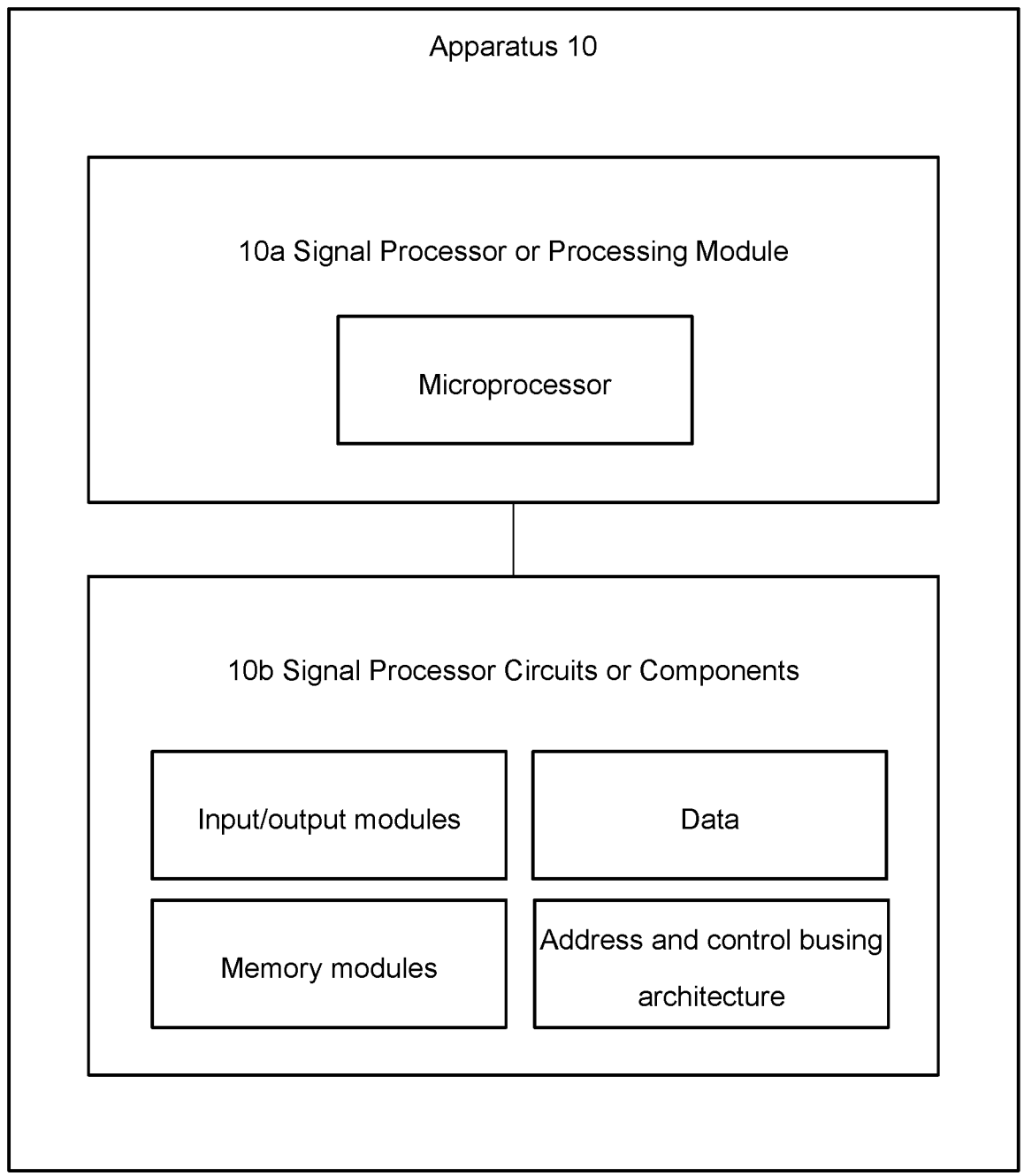
FIG. 1 is a block diagram of apparatus, e.g., having a signal processor or processing module, configured for implementing signal processing functionality, according to some embodiments of the present invention.

FIG. 1: Implementation of Signal Processing Functionality By way of example, FIG. 1 shows apparatus 10 according to some embodiments of the present invention, e.g., featuring a signal processor or processing module 10a configured at least to:

receive signaling containing information about a motor winding temperature sensed inside a motor when the motor is not being required to produce torque and rotation; and determine corresponding signaling containing information about a controlled direct current (DC) level for applying to at least one motor winding of the motor in order to provide a desired level of heating to the motor, based upon the signaling received.

In operation, the signal processor or processing module may be configured to provide corresponding signaling, e.g., to another circuit, component or module that is configured to apply the controlled DC level determined to the at least one motor winding of the motor in order to provide the desired level of heating to the motor.

Figure 2:
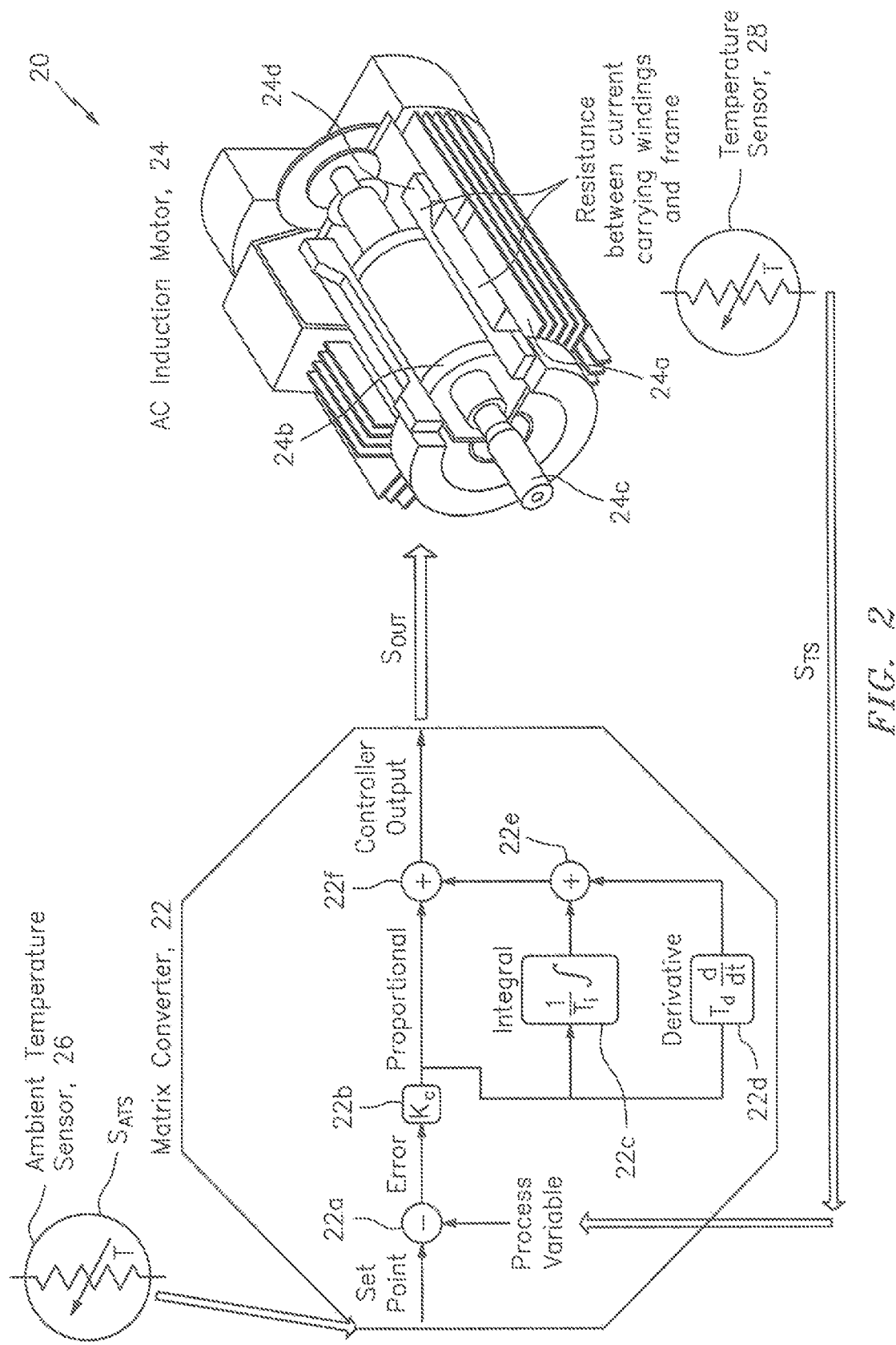
FIG. 2 is a diagram of a motor and variable frequency drive system having a matrix converter for controlling the operation of an AC induction motor, according to some embodiments of the present invention.

The signal processor or processing module 10a may be configured in, or form part of, a matrix converter like element 22 (see FIG. 2), e.g., which may include or be implemented in conjunction with a motor control or controller configured therein for controlling a motor like element 24 (see FIG. 2). By way of example, embodiments are envisioned in which the apparatus is, or forms part of, a pump system like element 20 (see FIG. 2) having the matrix converter 22 with the signal processor or processing module 10a, and embodiments are envisioned in which the apparatus is, or forms part of, a pump control or controller having the signal processor or processing module 10a.

By way of example, the functionality of the apparatus 10 may be implemented using hardware, software, firmware, or a combination thereof. In a typical software implementation, the apparatus 10 would include one or more microprocessor-based architectures having, e. g., at least one signal processor or microprocessor like element 10a. One skilled in the art would be able to program with suitable program code such a microcontroller-based, or microprocessor-based, implementation to perform the functionality described herein without undue experimentation. For example, the signal processor or processing module 10a may be configured, e.g., by one skilled in the art without undue experimentation, to receive the signaling containing information about a motor winding temperature sensed inside a motor when the motor is not being required to produce torque and rotation, consistent with that disclosed herein.

Moreover, the signal processor or processing module 10a may be configured, e.g., by one skilled in the art without undue experimentation, to determine the corresponding signaling containing information about a controlled direct current (DC) level for applying to at least one motor winding of the motor in order to provide a desired level of heating to the motor, consistent with that disclosed herein.

The scope of the invention is not intended to be limited to any particular implementation using technology either now known or later developed in the future. The scope of the invention is intended to include implementing the functionality of the processors 10a as stand-alone processor, signal processor, or signal processor module, as well as separate processor or processor modules, as well as some combination thereof.

The apparatus 10 may also include, e.g., other signal processor circuits or components 10b, including random access memory or memory module (RAM) and/or read only memory (ROM), input/output devices, and control, data and address buses connecting the same, and/or at least one input processor and at least one output processor, e.g., which would be appreciate by one person skilled in the art.

FIG. 2: The Basic Motor and Variable Frequency Drive (VFD) System

FIG. 2 shows a Motor and VFD system generally indicated as 20 having the matrix converter 22 for controlling the operation of an AC induction motor 24, e.g., based at least in part on ambient temperature sensor signaling from an ambient temperature sensor 26 and a motor winding temperature sensor 28. By way of example, in operation the matrix converter 22 may be configured to receive an ambient temperature sensor signal $S_{ATS}$ along line 26a from the ambient temperature sensor 26, and a motor winding temperature sensor signal $S_{TS}$ along line 28a from the ambient temperature sensor 26, and provide an output signal $S_{OUT}$ along line 22g to the AC induction motor 24. The signal processing functionality of the matrix converter 22 is described in further detail below in relation to the flowchart in FIG. 3, including that shown and described in FIG. 3A in relation to step 56k (FIG. 3).

By way of further example, the AC induction motor 24 may be configured with a frame 24a, a rotor 24b arranged on a shaft 24c, and motor windings 24d. By way of example, the AC induction motor 24 is shown having resistance between the current carrying windings 24d and the motor frame 24a. As one skilled in the art would appreciate, the AC induction motor 24 includes numerous other parts and components that do not form part of the underlying invention and are not identified or described in detail. Motors like element 24 are known in the art, and the scope of the invention is not intended to be limited to any particular type or kind either now known or later developed in the future.

The motor and variable frequency drive system 20 also may include the ambient temperature sensor 26 and the internal motor winding temperature sensor 28. In operation, the ambient temperature sensor 26 responds to the ambient temperature external to the AC induction motor 24, and provides the ambient temperature sensor signaling $S_{ATS}$ containing information about the ambient temperature external to the AC induction motor 24. As shown, the ambient temperature sensor signaling $S_{ATS}$ is provided to the matrix converter 22 for further processing, e.g., by a signal processor or processing module like element 10a, consistent with that set forth herein. In operation, the internal motor winding temperature sensor 28 responds to the internal temperature of the AC induction motor 24, e.g., caused at least in part by AC or DC current flowing through the motor windings 24d, and provides internal temperature sensor signaling $S_{TS}$ containing information about the internal temperature of the AC induction motor 22. As shown, the internal temperature sensor signaling $S_{TS}$ is provided to the matrix converter 22 for further processing, e.g., by a signal processor or processing module like element 10a, consistent with that set forth herein.

Figure 3:
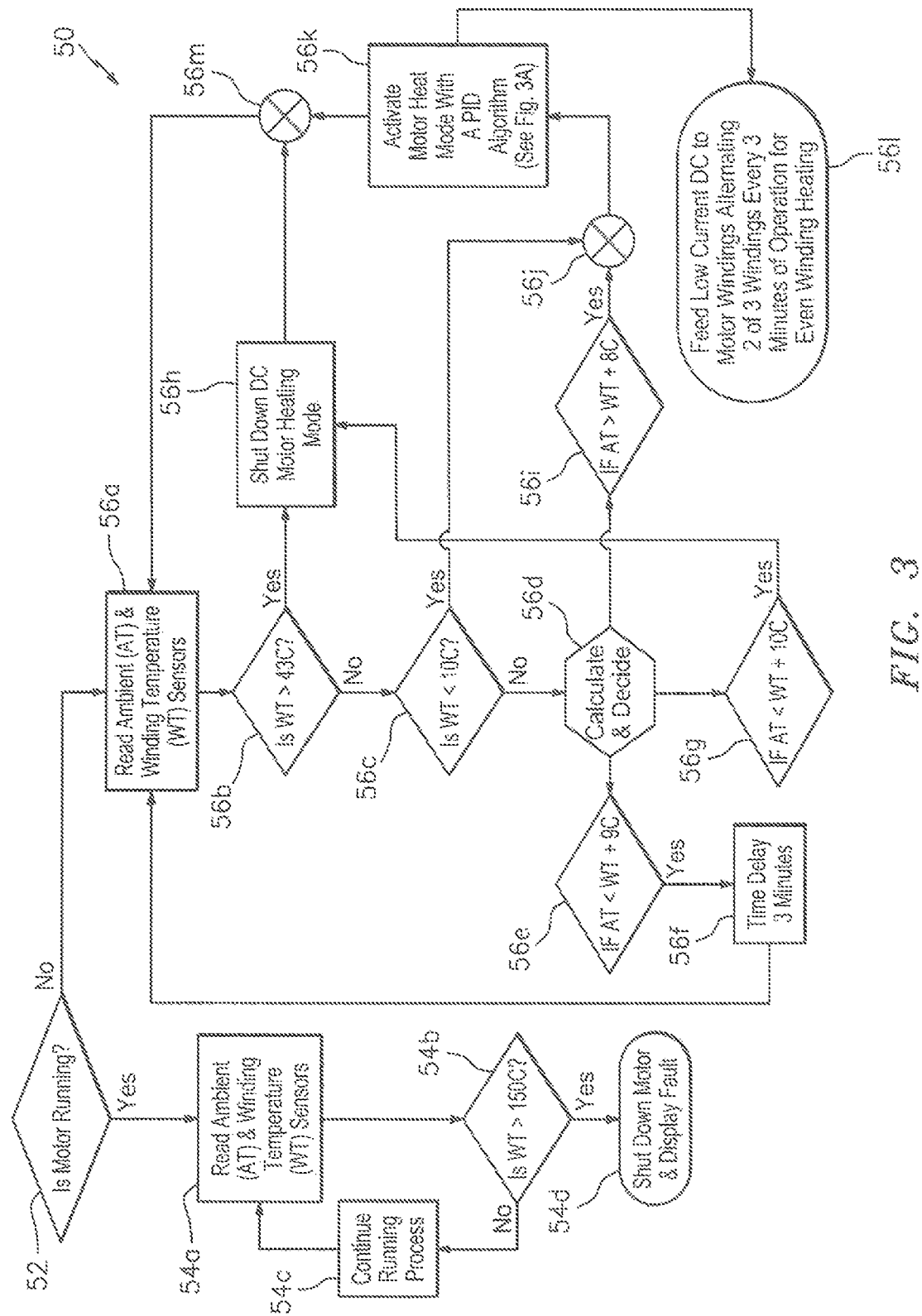
FIG. 3 is a flowchart of a method having steps for implementing an algorithm for controlling the operation of the AC induction motor in FIG. 2, according to some embodiments of the present invention.

FIG. 3: The Flowchart

FIG. 3 shows a flowchart generally indicated as 50 of a method having steps 52; 54a, 54b, 54c, 54d; and 56a, 56b, 56c, . . . , 56m for implementing an algorithm, e.g., using a signal processor or signal processing module like element 10a, according to some embodiments of the present invention. The steps in FIG. 3 are understood to be implemented in relation to the pump system 20 shown in FIG. 2.

In operation, step 52 calls for determining if the AC induction motor 24 is running. If the motor 24 is running, then some combination of steps 54a through 54d are performed. If the motor 24 is not running, then some combination of steps 56a through 56m are performed.

By way of example, if the motor 24 is running, then step 54a calls for reading the ambient temperature (AT) provided by the ambient temperature sensor 26 and also calls for reading the internal temperature (aka the "winding temperature" (WT)) provided by the internal temperature sensor 28. Step 54b calls for determining if the "winding temperature" (WT) is greater than some predetermined motor running winding temperature, e.g., 150° C. as shown. If not, then step 54c calls for a continue running process, e.g., which keeps the motor 24 running. If so, then step 54d calls for a shut down motor and display fault process, e.g., which shuts down the motor 24 and displays a fault message.

In contrast, if the motor 24 is not running, then step 56a calls for reading the ambient temperature (AT) provided by the ambient temperature sensor 26 and also calls for reading the "winding temperature" (WT) provided by the internal temperature sensor 28. Step 56b calls for determining if the "winding temperature" (WT) is greater than some predetermined motor not running high winding temperature, e.g., 43° C. as shown. If not, then step 56c calls for determining if the "winding temperature" (WT) is less than some predetermined motor not running low winding temperature, e.g., 10° C. as shown. If not, then step 56d calls for determining if the ambient temperature (AT) is greater than or less than the winding temperature using a calculate and decide process. For example, step 56e calls for determining if AT<WT+9° C.; and if so, implementing a time delay process in step 56f and repeating the step 56a. In comparison, steps 56g calls for determining if AT<WT+10° C.; and if so, implementing a shut down DC motor heating mode in step 56h. In step 56b, if the "winding temperature" (WT) is greater than the predetermined motor not running high winding temperature, e.g., 43° C. as shown, then the shut down DC motor heating mode in step 56h is also implemented. In further comparison, step 56i calls for determining if AT>WT+8° C.; and if so, implementing the same process as if the WT is greater than the predetermined motor not running low winding temperature as determined in step 56c and as indicated by the summing step 56j. The same process takes the form of step 56k, which calls for activating a motor heat mode with a proportional/integral/derivative (PID) algorithm, e.g., consistent with that shown and described in relation to FIG. 3A below. The motor heat mode with the PID algorithm implemented in step 56k calls for implementing step 56l by feeding low current DC to the motor windings 24d (FIG. 2), e.g., by alternating 2 of 3 winding every three minutes of operation for providing even motor winding heating. As shown, once steps 56h and 56k are implemented, the method calls for implementing the summing step 56m and repeating the step 56a.

The specific temperatures are provided herein by way of example, and the scope of the invention is not intended to be limited to any specific temperature. In other words, embodiment are envisioned within the spirit of the present invention, and the scope of the invention is intended to include, using other temperatures than that set forth herein.

FIG. 3A: Step 56k

By way of example, FIG. 3A shows an example of the signal processing functionality of the activate motor heat mode with the PID algorithm of step 56k that may be implemented at least in part by a PID controller that forms at least a part of the matrix converter 22 (FIG. 2), consistent with that shown in FIGS. 3 and 3A. For example, in FIG. 3A the PID controller may include a combination of a subtraction node 22a, an proportional node ($K_c$) 22b, an integral node 22c, a derivative node 22d, and two summing nodes 24e and 24f, and may operate as follows:

The subtraction node 22a may be configured to respond to set point signaling containing information about a set point, and also respond to process variable signaling containing information about a process variable, and provide error signaling containing information about an error related to a comparison between the set point and the process variable.

The proportional node ($K_c$) 22b may be configured to respond to the error signaling and provide proportional signaling containing information about a proportional response to the error related to the comparison between the set point and the process variable.

The integral node 22c may be configured to respond to the error signaling and provide integral signaling containing information about an integral response to the error related to the comparison between the set point and the process variable.

The derivative node 22d may be configured to respond to the error signaling and provide derivative signaling containing information about a derivative response to the error related to the comparison between the set point and the process variable.

The summing node 24e may be configured to respond to the integral signaling and the derivative signaling, and provide combined integral/derivative signaling containing information about a combined integral/derivative response to the error related to the comparison between the set point and the process variable.

The summing node 24f may be configured to respond to the combined integral/derivative signaling, and also respond to the proportional signaling, and provide combined proportional/integral/derivative signaling containing information about a combined proportional/integral/derivative response to the error related to the comparison between the set point and the process variable. In step 56k, the PID controller may be configured to provide the combined proportional/integral/derivative signaling as controller output signaling $S_{OUT}$ containing information about a controller output for controlling the AC induction motor 24 (FIG. 2).

As one skilled in the art would appreciate, the signal processing functionality of the subtraction node 22a, the proportional node ($K_c$) 22b, the integral node 22c, the derivative node 22d, and the two summing nodes 24e and 24f may be implemented in whole or in part by a signal processor or processing module like element 10a, e.g., using the microprocessor-based architecture set forth herein.

Signal processing techniques/algorithms for implementing PID controller functionality for controlling motors, e.g. like element 24, are known in the art, and the scope of the invention is not intended to be limited to any particular type or kind thereof either now known or later developed in the future.

Points of Novelty of the Present Invention

Points of novelty of the present invention may include, or take the form of, one or more of the following:

1. A closed loop system like element 20 with two thermal sensing devices like elements 26 and 28, e.g. which may include using resistance temperature device (RTD), a thermocouple, or a thermistor to sense both motor winding temperature and ambient temperature.

Figure 4:
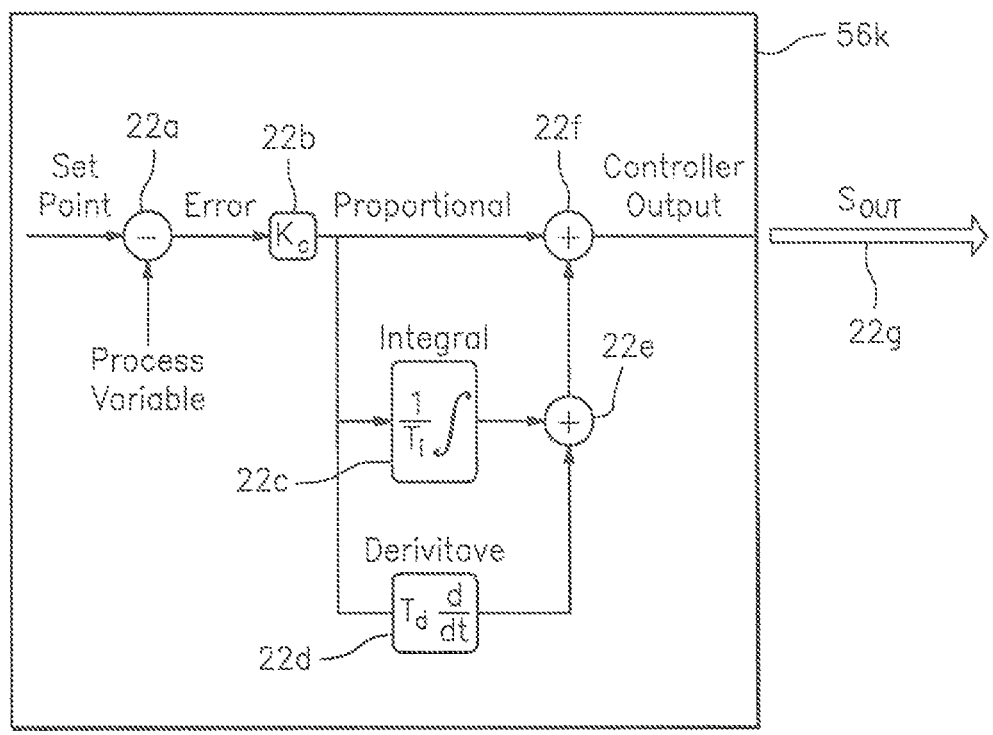
FIG. 4 is a graph of DC voltage versus time of a matrix converter DC output waveform for providing to motor windings of a motor, according to some embodiments of the present invention.
Figure 4:
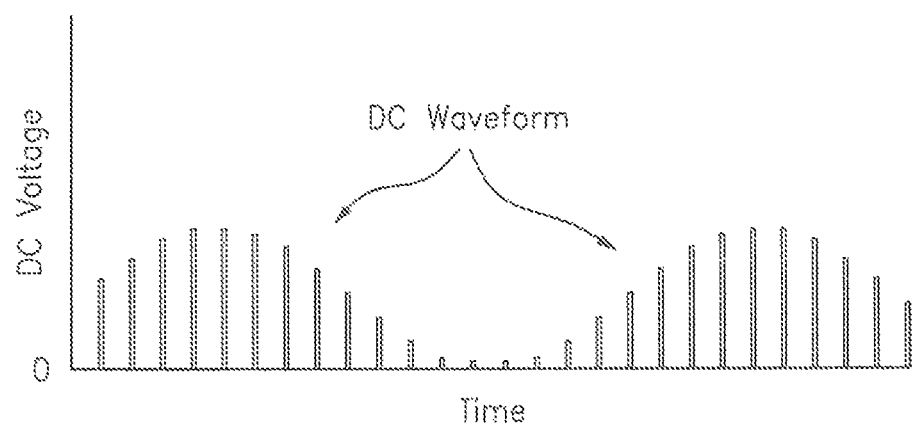

2. A matrix controller like element 22 that produces DC voltage having a waveform like that shown in FIG. 4 with high frequency riding on the waveform when the heating stator motor windings 24d. The DC output may alternate on all 3 phases to provide even heating on all 3 phase windings, and no rotational torque.

3. Due to the high frequency riding on the DC waveform, the present invention provides additional rotor heating via capacitive coupling from the stator windings to the rotor.

4. Most energy efficient technique. Only the amount of heat required will be used to keep the motor windings 24d at an ideal temperature. Past methods known in the art use an estimation method that does not take into account ambient and actual winding temperature.

5. No chance for overheating due to a closed loop feedback. Actual motor winding temperature is sensed vs. estimated temperature that could change in relation to ambient temperature fluctuations.

6. A maximum winding temperature, e.g., of about 43° C., would assure minimal condensation could not build up internally, due to maximum ambient dew point.

7. The limiting of motor winding temperatures, e.g., to a maximum of approximately 43° C., warrants the extended life span of the motor windings insulation system due to minimal peak thermal stress.

8. The minimum winding temperature, e.g., of about 10° C., would substantially guarantee reduced resistance swings due to the motor's positive temperature coefficient of copper windings.

The Matrix Converter

By way of example, provisional patent application Ser. No. 62/307,037, filed 11 Mar. 2016, discloses a matrix converter developed by the assignee of the present application, which is hereby incorporated by reference in its entirety.

THE SCOPE OF THE INVENTION

It should be understood that, unless stated otherwise herein, any of the features, characteristics, alternatives or modifications described regarding a particular embodiment herein may also be applied, used, or incorporated with any other embodiment described herein. Also, the drawing herein is not drawn to scale.

Although the present invention is described by way of example in relation to an AC induction motor, the scope of the invention is intended to include using the same in relation to other types or kinds of motors either now known or later developed in the future.

Although the invention has been described and illustrated with respect to exemplary embodiments thereof, the foregoing and various other additions and omissions may be made therein and thereto without departing from the spirit and scope of the present invention.

What we claim is:

1. An apparatus to provide alternating current (AC) voltage and direct current (DC) to a multi-phase motor having motor windings, the apparatus comprising:
   a matrix converter with a signal processor or processing module configured to:
   receive signaling from a motor winding temperature sensor, wherein the signaling includes information about a temperature of at least one motor winding of the motor windings that is sensed inside the motor by the motor winding temperature sensor when the motor is not being required to produce torque and rotation;
   receive signaling from an ambient temperature sensor located externally to the motor, wherein the signaling from the ambient temperature sensor includes information about an ambient temperature outside of the motor;
   determine an alternating current (AC) voltage to provide sufficient power to produce torque and rotation in the motor;
   based on the received signaling that includes information about the temperature of the at least one winding and about the ambient temperature, determine a pulsating direct current (DC) voltage to provide sufficient average power to generate a level of heating, sufficient to prevent or reduce moisture in the motor, when the pulsating DC voltage is applied to the at least one motor winding of the motor, wherein the average power of the pulsating DC voltage is lower than the power of the AC voltage so as not to produce torque and rotation;
   use a proportional/integral/derivative (PID) algorithm to activate a motor heat mode; and
   apply the pulsating DC voltage to the at least one winding during the motor heat mode, wherein:
   the pulsating DC voltage comprises a DC waveform having a plurality of DC pulses in each cycle of the DC waveform,
   the pulsating DC voltage is applied to heat the at least one winding to within a first temperature range above the ambient temperature, if the ambient temperature is within a second temperature range,
   the pulsating DC voltage is applied to heat the at least one winding to maintain a continuous winding temperature, if the ambient temperature falls below a first threshold temperature, and
   application of the pulsating DC voltage is stopped, if the ambient temperature rises above a second threshold temperature.

2. The apparatus according to claim 1, wherein the signal processor or processing module is configured to:
   apply the pulsating DC voltage to all of the motor windings of the motor.

3. The apparatus according to claim 1, wherein the signal processor or processing module is further configured to:
   control an operation of the motor to produce torque and rotation, so that all of the motor windings of the motor serve as both a heater at times and to produce the torque and rotation at other times.

4. The apparatus according to claim 1, wherein the matrix converter further comprises a power structure configured to provide the AC voltage to all of the motor windings directly to allow the motor to produce torque and rotation.

5. The apparatus according to claim 4, wherein the power structure is further configured to provide the pulsating DC voltage to all of the motor windings directly when the motor is not required to produce torque and rotation.

6. The apparatus according to claim 1, further comprising a motor controller having a first operation mode and a second operation mode, and arranged to provide a variable frequency and level of the AC voltage to the motor to cause the motor to rotate in the first operation mode and arranged to provide at least a portion of the pulsating DC voltage to the motor to heat all of the motor windings without causing the motor to rotate in the second operation mode.

7. The apparatus according to claim 1, wherein the signal processor or processing module is configured to control an operation of the matrix converter to rotate the motor.

8. The apparatus according to claim 1, wherein the first temperature range is 8-10° C. above the ambient temperature, and wherein the ambient temperature is between 10° C.-43° C.

9. The apparatus according to claim 1, wherein the first threshold temperature of the ambient temperature is about 0° C., and wherein the continuous winding temperature is about 10° C.

10. The apparatus according to claim 1, wherein the second threshold temperature of the ambient temperature is about 43° C.

11. The apparatus according to claim 7, further comprising:
   the motor winding temperature sensor configured to sense the temperature of the at least one winding and to provide the signaling that includes the information about the sensed temperature of the at least one winding; and the ambient temperature sensor configured to sense the ambient temperature and to provide the signaling that includes the information about the sensed ambient temperature.

12. A method to provide alternating current (AC) voltage and direct current (DC) to a multi-phase motor having motor windings, the method comprising:

receiving, at a signal processor or processing module of a matrix converter, signaling from a motor winding temperature sensor, wherein the signaling includes information about a temperature of at least one motor winding of the motor windings that is sensed inside the motor by the motor winding temperature sensor when the motor is not being required to produce torque and rotation;

receiving signaling from an ambient temperature sensor located externally to the motor, wherein the signaling from the ambient temperature sensor includes information about an ambient temperature outside of the motor;

determining an alternating current (AC) voltage to provide sufficient power to produce torque and rotation in the motor;

based on the received signaling that includes information about the temperature of the at least one winding and about the ambient temperature, determining a pulsating direct current (DC) voltage to provide sufficient average power to generate a level of heating, sufficient to prevent or reduce moisture in the motor, when the pulsating DC voltage is applied to the at least one motor winding of the motor, wherein the average power of the pulsating DC voltage is lower than the power of the AC voltage so as not to produce torque and rotation;

using a proportional/integral/derivative (PID) algorithm to activate a motor heat mode; and applying the pulsating DC voltage to the at least one winding during the motor heat mode, wherein:

the pulsating DC voltage comprises a DC waveform having a a plurality of DC pulses in each cycle of the DC waveform, the pulsating DC voltage is applied to heat the at least one winding to within a first temperature range above the ambient temperature, if the ambient temperature is within a second temperature range, the pulsating DC voltage is applied to heat the at least one winding to maintain a continuous winding temperature, if the ambient temperature falls below a first threshold temperature, and application of the pulsating DC voltage is stopped, if the ambient temperature rises above a second threshold temperature.

13. The method according to claim 12, further comprising:

applying the pulsating DC voltage to all of the motor windings of the motor.

14. The method according to claim 12, further comprising:

controlling an operation of the motor to produce torque and rotation with the signal processor or processing module such that all of the motor windings of the motor serve as both a heater at times and to produce the torque and rotation at other times.

15. The method according to claim 12, further comprising:

configuring a power structure of the matrix converter to provide the AC voltage to all of the motor windings directly such that the motor produces torque and rotation.

16. An apparatus to provide alternating current (AC) voltage and direct current (DC) to a multi-phase motor having motor windings, the apparatus comprising:

a motor winding temperature sensor coupled to the motor windings;

an ambient temperature sensor; and a matrix converter coupled to the motor winding temperature sensor and to the ambient temperature sensor, wherein the matrix converter includes a signal processor or processing module configured to:

receive signaling from the motor winding temperature sensor, wherein the signaling includes information about a temperature of at least one motor winding of the motor windings that is sensed inside the motor by the motor winding temperature sensor when the motor is not being required to produce torque and rotation;

receive signaling from the ambient temperature sensor located externally to the motor, wherein the signaling from the ambient temperature sensor includes information about an ambient temperature outside of the motor;

determine an alternating current (AC) voltage to provide sufficient power to produce torque and rotation in the motor;

based on the received signaling that includes information about the temperature of the at least one winding and about the ambient temperature, determine a pulsating direct current (DC) voltage to provide sufficient average power to generate a level of heating, sufficient to prevent or reduce moisture in the motor, when the pulsating DC voltage is applied to the at least one motor winding of the motor, wherein the average power of the pulsating DC voltage is lower than the power of the AC voltage so as not to produce torque and rotation;

use a proportional/integral/derivative (PID) algorithm to activate a motor heat mode; and apply the pulsating DC voltage to the at least one winding during the motor heat mode, wherein, the pulsating DC voltage comprises a DC waveform having a high frequency transistor switching component riding on the DC waveform and further having a plurality of DC pulses in each cycle of the DC waveform.

* * * * *